UNITED STATES PATENT OFFICE.

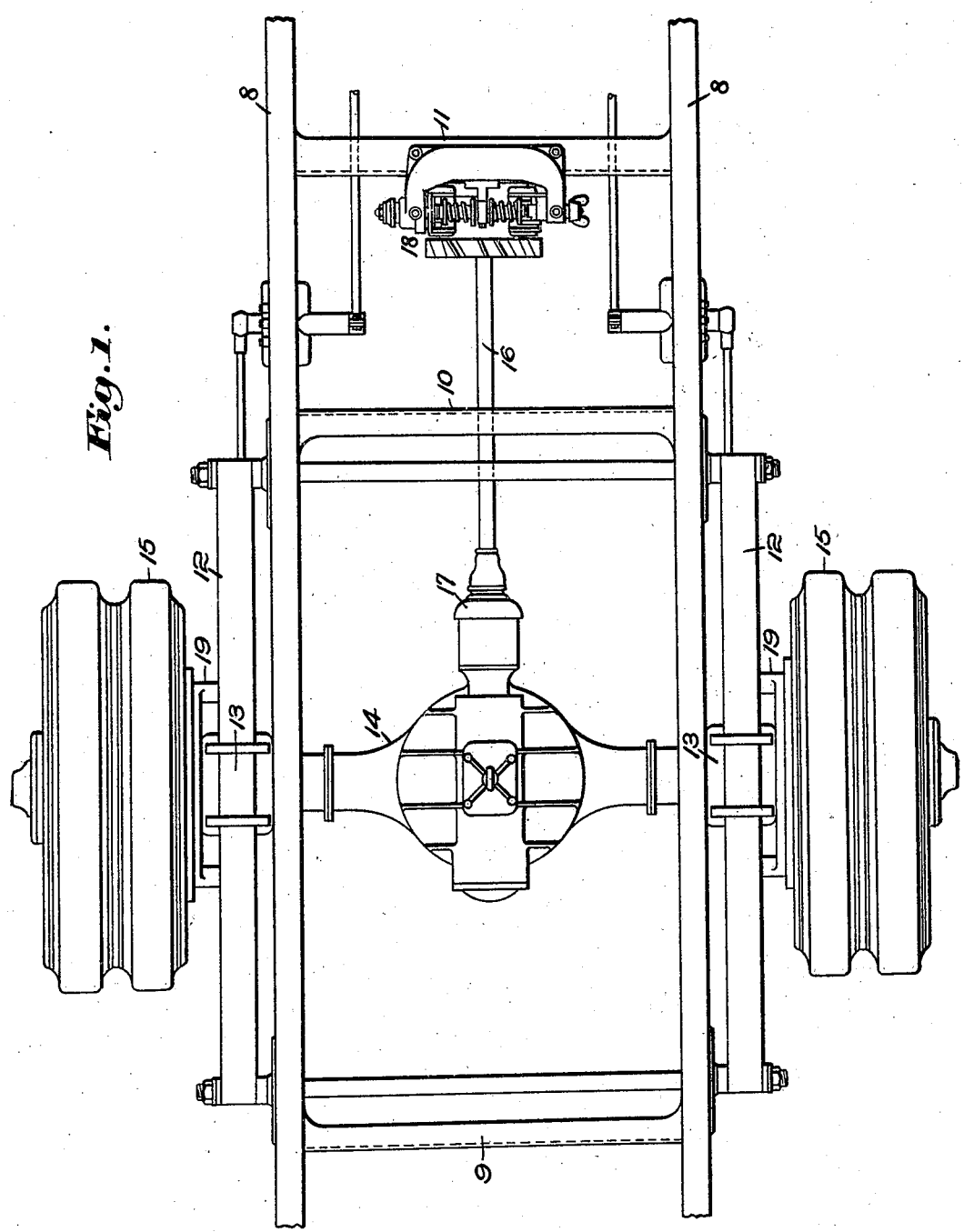

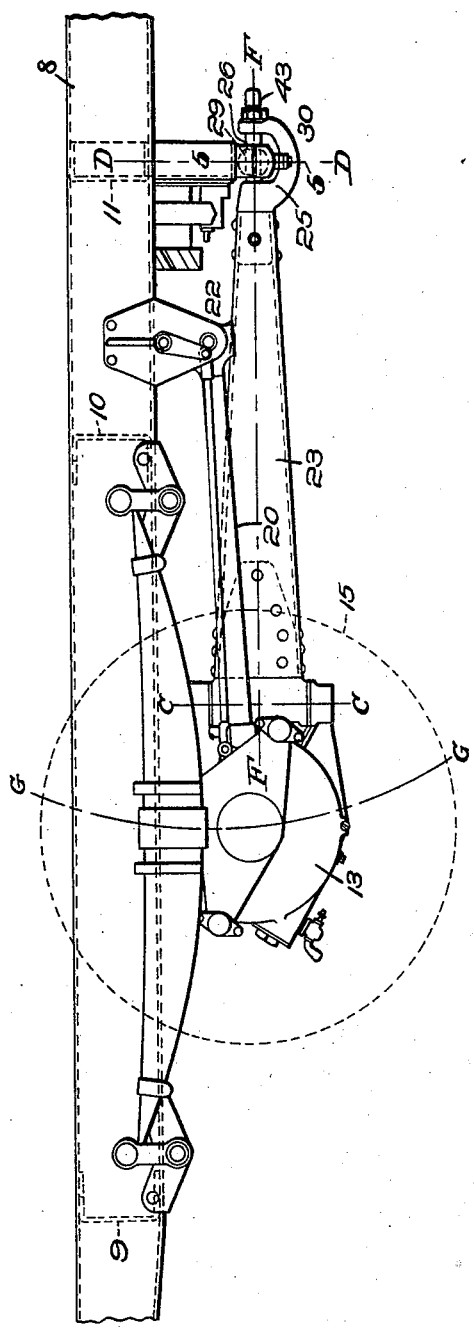

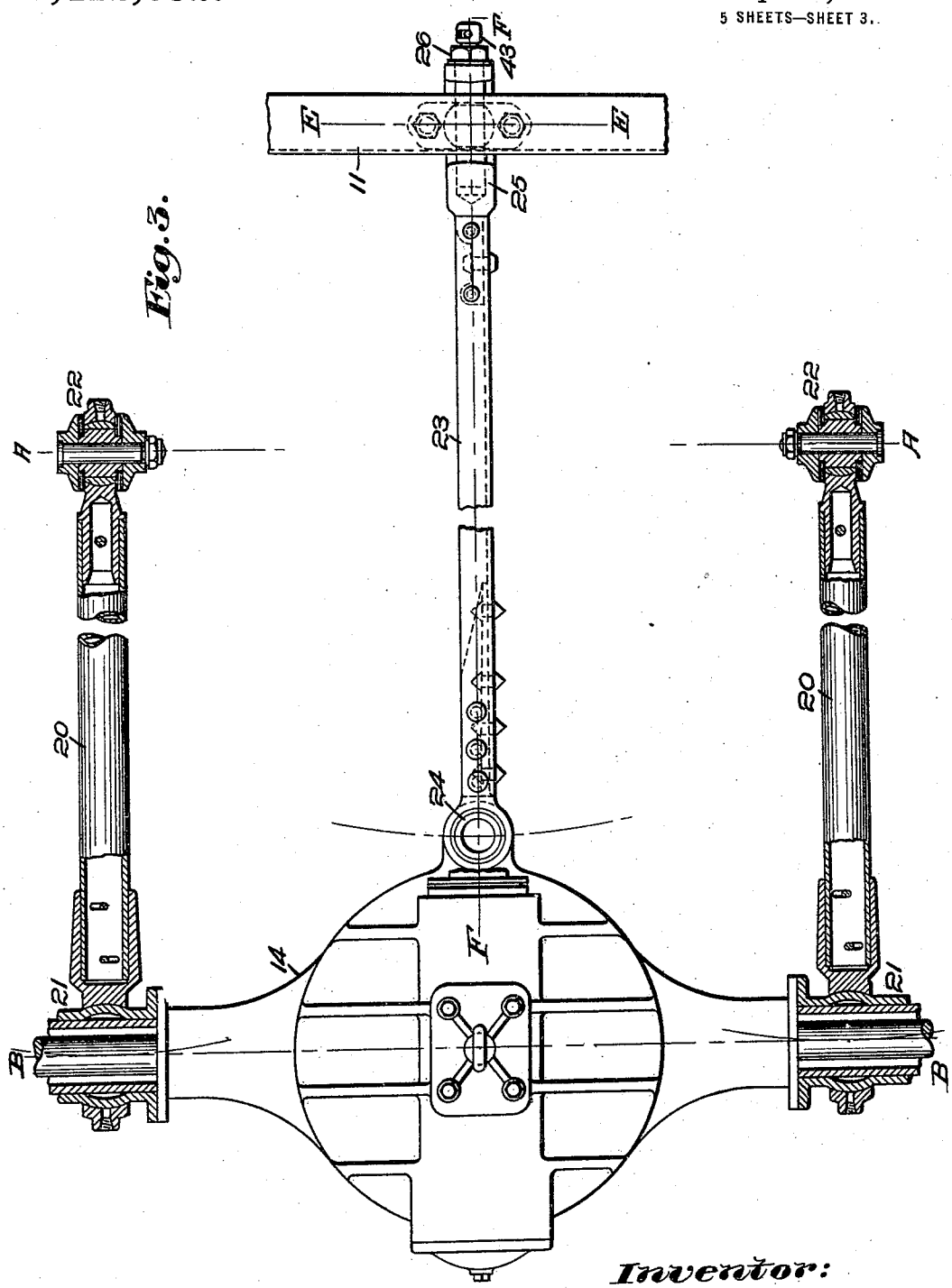

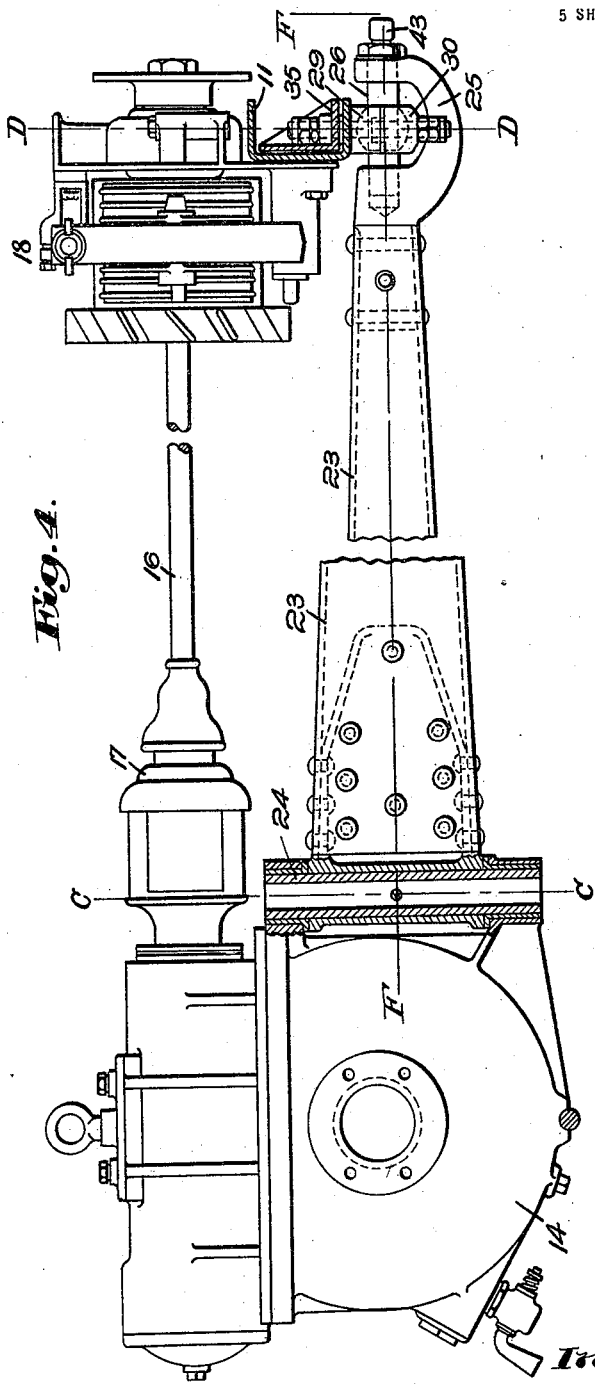

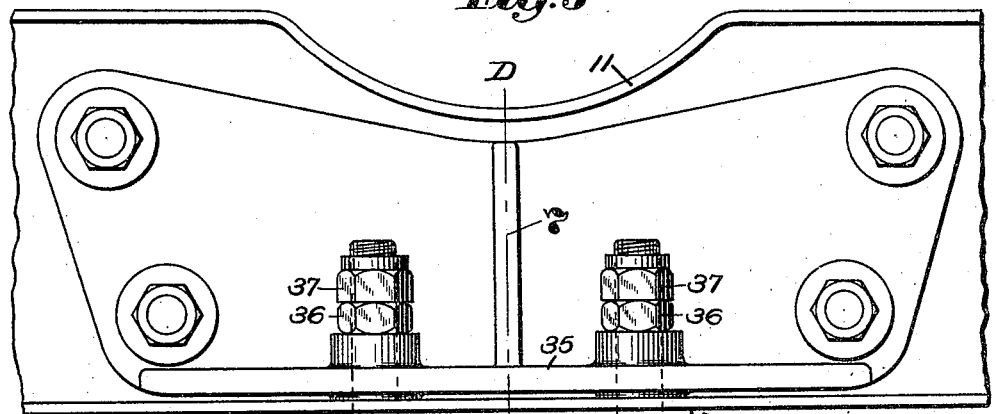
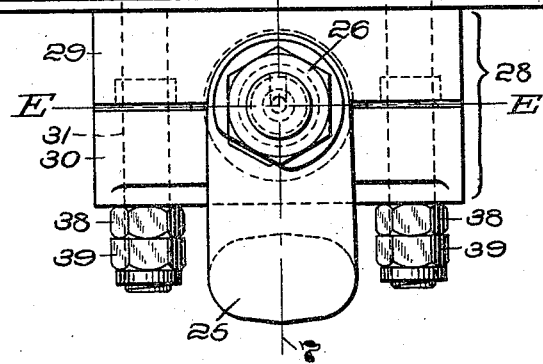
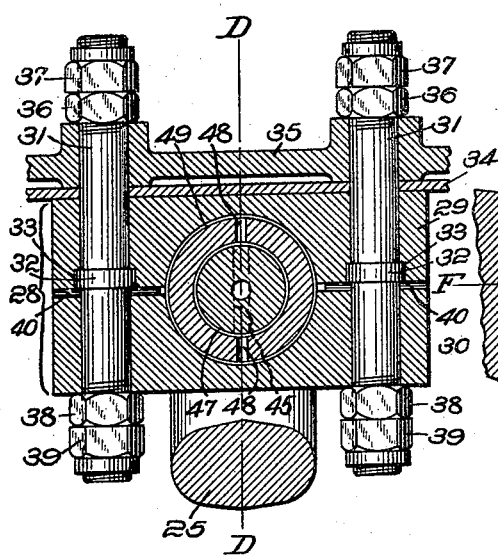
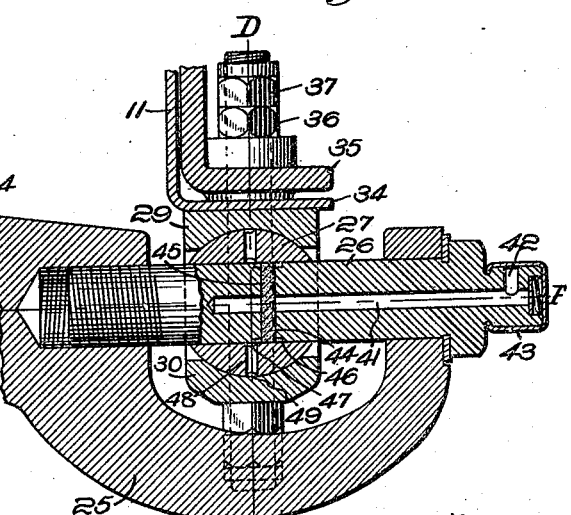

GEORGE E. GARNO, OF BRIDGEPORT, CONNECTICUT, ASSIGNOR, BY MESNE ASSIGNMENTS, TO THE LOCOMOBILE COMPANY, OF BRIDGEPORT, CONNECTICUT, A CORPORATION OF DELAWARE.

MOTOR VEHICLE.

1,412,052.

Specification of Letters Patent.   Patented Apr. 11, 1922.

Application filed June 10, 1918.   Serial No. 239,092.

*To all whom it may concern:*

Be it known that I, GEORGE E. GARNO, a citizen of the United States, and a resident of Bridgeport, county of Fairfield, and State of Connecticut, have invented an Improvement in Motor Vehicles, of which the following description, in connection with the accompanying drawings, is a specification, like characters on the drawings representing like parts.

This invention relates to motor vehicles of the class in which the torque reaction, due to the driving of the wheels, is received by a torque bar connecting the axle to the frame, and is more especially concerned with a construction providing for a greater degree of relative flexibility of the torque bar and the associated parts, with consequent reduction of wear and breakage, as compared with former structures of this class.

My invention will be best understood by reference to the following description, when taken in connection with the accompanying drawings of one specific embodiment thereof, while its scope will be more particularly pointed out in the appended claims.

In the drawings:

Fig. 1 is a plan of a portion of a motor vehicle embodying my invention;

Fig. 2 is a side elevation of the same, with the wheels omitted and indicated merely by a dotted circle;

Fig. 3 is a plan on an enlarged scale, and partly in horizontal section, illustrating the axle, radius rods, torque bar, and its connections with the axle and frame;

Fig. 4 is a side elevation at the same scale as Fig. 3, illustrating the axle, longitudinal propeller shaft, the torque bar and its connections with the axle and frame, some of the parts being shown in vertical section;

Fig. 5 is a front elevation on a much enlarged scale, illustrating the forward end of the torque bar, a portion of a cross member of the frame, and the means for supporting the torque bar thereon;

Fig. 6 is a detail sectional view on the same scale as Fig. 5, taken on the line 5—5 of Fig. 2; and Fig. 7 is a sectional view on line 7—7 of Fig. 5.

Referring to the drawings, and to the embodiment of my invention which is illustrated therein, I have there shown a portion of a motor vehicle having a frame which may be of any suitable construction, the same herein comprising a pair of longitudinal members 8, best shown in Fig. 1, connected to each other by a plurality of transverse members 9, 10 and 11. The frame may be supported in any usual or desired manner, as by springs 12, herein secured to spring members 13, the latter being preferably mounted to turn freely on an axle 14, with which any suitable driving wheels 15 may be associated in any appropriate manner. The wheels may be driven by any usual or desired mechanism, herein a longitudinal propeller shaft 16 of common form, connected at its rear end to the axle by a universal joint 17 in a well-known manner. If desired, the propeller shaft may be equipped with any usual or desired brake 18, usually operated by foot, and sometimes called the foot brake and sometimes the running brake. The wheels may be equipped with usual marginal brakes 19, best shown in Fig. 1.

The motor vehicle herein selected for illustration is of the type in which the driving is through distance or radius rods 20, best shown in Fig. 3, connecting the axle 14 to the frame, and serving to maintain the axle in a definite position lengthwise of the vehicle. In the present instance, these radius rods are connected at their rear ends to the axle 14 by ball and socket joints 21, and are connected at their front ends to the longitudinal members 8 of the frame by ball and socket joints 22, in such a manner as to permit the axle to play up and down about a horizontal axis A—A above the ball and socket joints 22, and to move axially in a direction parallel with its own axis B—B, it being evident that both vertical and horizontal movements are permitted by reason of the provision of the universal joints 21 and 22, as will be readily understood by an inspection of Fig. 3.

As a means for receiving the torque reaction strains, I have provided a torque bar 23, connected to the axle and to the frame in such a manner as to provide for swinging movement of said bar in a horizontal direction to accompany axial movement of said axle. To this end, the torque bar is herein connected to the axle by a generally upright pivot 24, best shown in Fig 4, and is connected to the transverse member 11 of the frame by means of a universal joint of novel form, which permits both vertical and horizontal swinging movement of the torque bar, as well as forward and backward movements of the latter with respect to the frame. Referring now to Figs. 5, 6 and 7, wherein this universal joint is shown in detail, the forward end of the torque bar 23 is preferably provided with a yoke 25 to form front and rear supports for a generally horizontal sliding member 26, herein in the form of a stud passing loosely through the forward end of the yoke and threaded at its rear end into the latter. On this stud is mounted a ball 27 held in a suitable socket 28, the latter herein comprising upper and lower separable parts 29 and 30, best shown in Fig. 6. These parts may be suitably secured to each other, as by studs 31. In the present example, the arrangement is such that the lower part 30 of the socket may be removed without disturbing the upper part. To this end, the studs are herein provided with shoulders 32, seated in correspondingly-shaped recesses 33. The studs extend upwardly through a horizontal flange 34 of the transverse frame member 11, and through a bracket 35, to which they are secured by nuts 36 and lock-nuts 37. The lower part 30 of the socket members is herein held in place by nuts 38 and lock-nuts 39, also threaded onto the studs 31. Suitable shims 40, herein comprising several thicknesses of thin sheet metal interposed between the upper and lower parts 29 and 30 of the socket, provide means of readjustment, whereby the socket may be reduced in size from time to time to take up wear by simply removing one or more thicknesses of the shims.

Referring now to Figs. 3 and 4, with special reference to the latter, it is evident that when the axle 13 moves lengthwise, such movement will be accompanied by horizontal swinging movement of the torque bar 23 about the axis C—C of the pivot 24 at its rear end, and about a center herein represented by the axis D—D containing the center of the ball 27. It is also evident that as the axle plays up and down, the torque bar will swing about a center, herein represented by the horizontal axis E—E, shown in Fig. 3. It should moreover be evident that, when one wheel 14 is elevated or depressed to a greater extent than the other, the axle 13 and torque bar 23 will swing about a generally horizontal axis F—F, which is the axis of the stud 26, since the up and down movement of the axle is restricted by the radius rods 20 to an arc G—G (Fig. 2), whose center is in the axis A—A. Such movement will naturally be accompanied by forward and backward sliding movement of the stud 26 in the ball 27. From the foregoing, it should be understood that the described universal joint provides for perfect freedom of swinging movement of the torque bar both horizontally and vertically, as well as forward and backward, to accompany corresponding movements of the axle. It follows that no matter how rough or irregular the ground may be, the construction is so thoroughly flexible at every point as to eliminate any possibility of cramping or binding, and the consequent danger of breakage and excessive wear.

Any appropriate means may be provided for the lubrication of the described universal joint, but in the present example, the stud 26 is provided with an axial oil hole 41, which may receive its supply through an oil hole 42, normally closed by a suitable cap 43, best shown in Fig. 7. The oil may be conducted from the passage 41 to the bearing surfaces in any appropriate manner, as by the provision of a radial passage or passages 44, preferably having a wick or wicks 45 therein, to carry the oil by capillary action in an outward direction to a circumferential channel 46 formed in the stud 26. It should be evident that, as the latter rotates and slides backward and forward, its cylindrical surface, working in its bearing in the ball 27, will be thoroughly lubricated. Oil may be conducted to the cooperating bearing surfaces of the ball 27 and socket 28 by providing said ball with an internal circumferential oil groove 47, communicating by way of one or more radial passages 48 with an internal circumferential groove 49, the latter feeding the oil directly to the bearing surfaces. In this way, oil from a single source of supply is fed to the bearing surfaces in sufficient quantities to lubricate the surfaces thoroughly, yet without waste of oil.

While I have herein shown and described one specific form or embodiment of my invention for illustrative purposes, and have disclosed and discussed in detail the construction and arrangement incidental to one specific application thereof, it is to be understood that the invention is limited neither to the mere details or relative arrangement of parts, nor to its specific embodiment herein shown, but that extensive deviations from the illustrated form or embodiment of the invention may be made, without departing from the principles thereof.

Having thus described one form of my invention, what I claim and desire by Letters Patent to secure is:

1. In a motor vehicle, the combination of a pair of driving wheels, an axle therefor, a longitudinal propeller shaft for driving said wheels, a pair of radius rods, universal joints connecting said radius rods on the one hand to said frame and on the other hand to said axle, a torque bar extending lengthwise of said shaft, and pivotal connections for the forward and rear ends of said torque bar providing for swinging movement of said torque bar in a horizontal direction to accompany axial movement of said axle.

2. In a motor vehicle, the combination of a pair of driving wheels, an axle therefor, a longitudinal propeller shaft for driving said wheels, a pair of radius rods, universal joints connecting said radius rods on the one hand to said frame and on the other hand to said axle, a torque bar extending lengthwise of said shaft, and means providing for swinging movement of said torque bar about generally upright axes to accompany axial movement of said axle, said means including a pivotal joint connecting the rear end of said torque bar to said axle, and a universal joint supporting the front end of said torque bar.

3. In a motor vehicle, the combination of a pair of driving wheels, an axle therefor, a longitudinal propeller shaft for driving said wheels, a torque bar extending lengthwise of said shaft, and means providing for swinging movement of said torque bar about generally upright axes to accompany axial movement of said axle, said means including a pivotal joint connecting the rear end of said torque bar to said axle, and a universal and forward and backward sliding joint supporting the front end of said torque bar.

4. In a motor vehicle, the combination of a pair of driving wheels, an axle therefor, a longitudinal propeller shaft for driving said wheels, a pair of radius rods, universal joints connecting said radius rods on the one hand to said frame and on the other hand to said axle, a torque bar extending lengthwise of said shaft, and pivotal connections for the forward and rear ends of said torque bar providing for swinging movement of said torque bar in a horizontal direction to accompany axial movement of said axle and turning movement of said torque bar about a longitudinal axis to accompany relative up and down movements of said wheels.

5. In a motor vehicle, the combination of a pair of driving wheels, an axle therefor, a longitudinal propeller shaft for driving said wheels, a pair of radius rods, universal joints connecting said radius rods on the one hand to said frame and on the other hand to said axle, and instrumentalities for receiving torque reaction strains, said instrumentalities including a torque member, and means providing for lengthwise movement of said axle in a direction parallel with its axis.

6. In a motor vehicle, the combination of a pair of driving wheels, an axle therefor, a longitudinal propeller shaft for driving said wheels, a pair of radius rods, universal joints connecting said radius rods on the one hand to said frame and on the other hand to said axle, and instrumentalities for receiving torque reaction strains, said instrumentalities including a torque member, and means providing for horizontal swinging movement of said torque member relatively to said axle and lengthwise movement of said torque member with reference to said propeller shaft.

7. In a motor vehicle, the combination of a pair of driving wheels, an axle therefor, a longitudinal propeller shaft for driving said wheels, a pair of radius rods, universal joints connecting said radius rods on the one hand to said frame and on the other hand to said axle, and instrumentalities for receiving torque reaction strains, said instrumentalities including a torque member and means providing for horizontal swinging movement of said torque member relatively to said axle, vertical swinging movement of said axle and torque member and lengthwise movement of said torque member with reference to said propeller shaft.

8. In a motor vehicle, the combination of a pair of driving wheels, an axle therefor, a longitudinal propeller shaft for driving said wheels, and instrumentalities for receiving torque reaction strains, said instrumentalities including a torque member, pivotal means providing for horizontal swinging movement of said torque member relatively to said axle and sliding means providing for lengthwise movement of said torque member with reference to said propeller shaft.

9. In a motor vehicle, the combination of a pair of driving wheels, an axle therefor, a longitudinal propeller shaft for driving said wheels, a pair of radius rods, universal joints connecting said radius rods on the one hand to said frame and on the other hand to said axle, a torque reaction receiving member extending lengthwise of said shaft, means providing for vertical and horizontal swinging movements of said member, and means providing for forward and backward movement of said member lengthwise of said shaft.

10. In a motor vehicle, the combination of a pair of driving wheels, an axle therefor, a longitudinal propeller shaft for driving said wheels, a torque reaction receiving member extending lengthwise of said shaft, pivotal means providing for vertical and horizontal swinging movements of said member, and sliding means providing for forward and backward movement of said member lengthwise of said shaft.

11. In a motor vehicle, the combination of a pair of driving wheels, an axle therefor, a longitudinal propeller shaft for driving said wheels, a torque reaction receiving member extending lengthwise of said shaft, a pivot connecting the rear end of said member to said axle, and a pivotal and sliding support for the front end of said member.

12. In a motor vehicle, the combination of a pair of driving wheels, an axle therefor, a longitudinal propeller shaft for driving said wheels, a torque reaction receiving member extending lengthwise of said shaft, a generally upright pivot connecting the rear end of said member to said axle, and a ball and socket and sliding joint supporting the front end of said member.

13. In a motor vehicle, the combination of a frame, a pair of driving wheels, an axle therefor, springs supporting said frame on said axle, a longitudinal propeller shaft for driving said wheels, radius rods connecting said axle to said frame, a torque member for receiving the torque reaction from said axle, a substantially upright pivot connecting said torque member to said axle, and a ball and socket connection between said torque member and said frame.

14. In a motor vehicle, the combination of a frame, a pair of driving wheels, an axle therefor, springs supporting said frame on said axle, a longitudinal propeller shaft for driving said wheels, radius rods connecting said axle to said frame, a torque member for receiving the torque reaction from said axle, a substantially upright pivot connecting said torque member to said axle, and a ball and socket and forward and backward sliding connection between said torque member and said frame.

15. In a motor vehicle, the combination of a frame, a pair of driving wheels, an axle therefor, springs connecting said axle with said frame, radius rods connecting said axle with said frame, a longitudinal propeller shaft for driving said wheels, a torque bar extending lengthwise of said shaft, a generally vertical pivot connecting the rear end of said torque bar to said axle, and means connecting the front end of said torque bar to said frame, said means including a generally horizontal, longitudinal pivot carried by said torque bar, a ball in which said pivot is slidable longitudinally, and a socket in which said ball is mounted.

16. In a motor vehicle, the combination of a frame, a pair of driving wheels, an axle therefor, springs connecting said axle with said frame, a longitudinal propeller shaft for driving said wheels, and means connecting the front end of said torque bar to said frame, said means including a yoke carried by said torque bar, a generally horizontal longitudinal pivot carried by said yoke, and a ball and socket joint connecting said pivot with said frame.

17. In a motor vehicle, the combination of a frame comprising a cross member, a pair of driving wheels, an axle therefor, a torque bar connected to said axle, and means connecting said torque bar to said frame, said means including a divisible socket mounted beneath said cross member, and a ball mounted in said socket.

18. In a motor vehicle, the combination of a frame comprising a cross member, a pair of driving wheels, an axle therefor, a torque bar connected to said axle, and means connecting said torque bar to said frame, said means including a socket comprising upper and lower separable parts mounted beneath said cross member, and a ball mounted in said socket.

19. In a motor vehicle, the combination of a frame, a pair of driving wheels, an axle therefor, a torque bar connected to said axle, and means connecting said torque bar to said frame, said means including a socket comprising upper and lower separable parts, means to secure said upper part to said frame, means to secure said lower part to said upper part, and a ball mounted in said socket.

20. In a motor vehicle, the combination of a frame, a pair of driving wheels, an axle therefor, a torque bar connected to said axle, and means connecting said torque bar to said frame, said means including a socket, a ball mounted in said socket, and a member slidably mounted in said ball for forward and backward movement therein.

21. In a motor vehicle, the combination of a frame, a pair of driving wheels, an axle therefor, a torque bar connected to said axle, and means connecting said torque bar to said frame, said means including a socket, a ball mounted in said socket, and a pivot mounted in said ball for forward and backward sliding movement and for turning movement about a longitudinal axis.

22. In a motor vehicle, the combination of a frame, a pair of driving wheels, an axle therefor, a torque bar connected to said axle, and means connecting said torque bar to said frame, said means including a socket, a ball mounted in said socket, and a member mounted in said socket for forward and backward movement therein, said member having provision for lubrication of its wearing surface.

23. In a motor vehicle, the combination of a frame, a pair of driving wheels, an axle therefor, a torque bar connected to said axle, and means connecting said torque bar to said frame, said means including a socket, a ball mounted in said socket, and a member slidably mounted in said ball for forward and backward movement therein, said ball being provided with lubricating means, and said member being provided with lubricating means communicating therewith.

24. In a motor vehicle, the combination of a frame, a pair of driving wheels, an axle therefor, a torque bar connected to said axle, and means connecting said torque bar to said frame, said means including a socket, a ball mounted in said socket, and a member slidably mounted in said ball for forward and backward movement therein, said ball being provided with one or more radial oil passages, and said member being provided with one or more oil passages communicating therewith.

25. In a motor vehicle, the combination of a frame, a pair of driving wheels, an axle therefor, a torque bar connected to said axle, and means connecting said torque bar to said frame, said means including a socket, a ball mounted in said socket, and a member slidably mounted in said ball for forward and backward movement therein, said ball being provided with inner and outer circumferential grooves and one or more passages connecting the same, and said member being provided with a longitudinal passage and one or more passages extending laterally therefrom and communicating with said inner groove.

26. In a motor vehicle, the combination of a frame, a pair of driving wheels, an axle therefor, a torque bar connected to said axle, and means connecting said torque bar to said frame, said means including a socket, a ball mounted in said socket, and a member slidably mounted in said ball for forward and backward movement therein, said member being provided with a longitudinal oil passage, one or more radial oil passages communicating therewith, and a circumferential groove communicating with said radial passage or passages.

27. In a motor vehicle, the combination of a frame, a pair of driving wheels, an axle therefor, a longitudinal propeller shaft for driving said wheels, a torque bar extending lengthwise of said shaft, and means providing for movement of said torque bar relatively to said frame accompanying axial movement of said axle, said means including a pivotal joint connecting said torque bar to said axle, and a pivotal joint comprising two parts, one of which is supported by said frame and the other of which presents a guide in which said torque bar is mounted for forward and backward sliding movement.

28. In a motor vehicle, the combination of a frame, a pair of driving wheels, an axle therefor, a longitudinal propeller shaft for driving said wheels, and instrumentalities for receiving torque reaction strains, said instrumentalities including a torque member, and pivotal means connecting said torque member on the one hand to said frame and on the other hand to said axle and providing for horizontal swinging movement of said torque bar relatively to said axle and frame, the pivotal means connecting said torque bar to said frame presenting a guide in which said torque bar is mounted for forward and backward sliding movement.

29. In a motor vehicle, the combination of a frame, a pair of driving wheels, an axle therefor, a longitudinal propeller shaft for driving said wheels, a torque reaction receiving member extending lengthwise of said shaft, pivotal means providing for vertical and horizontal swinging movements of said member relatively to said frame and axle, and sliding means connected to one of said pivotal means and providing for forward and backward movement of said member lengthwise of said shaft.

30. In a motor vehicle, the combination of a frame, a pair of driving wheels, an axle therefor, a longitudinal propeller shaft for driving said wheels, a torque reaction receiving member extending lengthwise of said shaft, a pivot connecting the rear end of said member to said axle, a pivot interposed between the front end of said member and said frame, and a longitudinal sliding joint connected to the last-mentioned pivot and providing for forward and backward movement of said member lengthwise of said shaft.

31. In a motor vehicle, the combination of a frame, a pair of driving wheels, an axle therefor, a longitudinal propeller shaft for driving said wheels, a torque reaction receiving member extending lengthwise of said shaft, a pivot connecting the rear end of said member to said axle, a universal joint interposed between the front end of said member and said frame, and a longitudinal sliding joint connected to said joint and providing for forward and backward movement of said member lengthwise of said shaft.

32. In a motor vehicle, the combination of a frame, a pair of driving wheels, an axle therefor, a longitudinal propeller shaft for driving said wheels, a torque reaction receiving member extending lengthwise of said shaft, and connections between said member and said axle and between said member and said frame, including a longitudinal sliding joint and two pivotal joints, one of said joints connecting said member to said axle and the other to said frame.

33. In a motor vehicle, the combination of a frame member, a pair of driving wheels, an axle member carrying said wheels, a longitudinal propeller shaft for driving said wheels, a torque reaction receiving member extending lengthwise of said shaft, and pivotal and sliding joints connecting said members, and providing for swinging movement of said torque member relatively to the other two members, and longitudinal sliding movement of said torque member relatively to one of the other two members.

In testimony whereof, I have signed my name to this specification.

GEORGE E. GARNO.